3,132,108
ISOLATION OF NEW SURFACE ACTIVE MATERIALS

Demetrios Theodore Emmanuel Zalichi and Aleksander Groszek, Sunbury-on-Thames, England, assignors to The British Petroleum Company Limited, London, England, a joint-stock corporation of Great Britain
No Drawing. Filed Oct. 26, 1959, Ser. No. 848,509
Claims priority, application Great Britain Oct. 31, 1958
7 Claims. (Cl. 252—356)

This invention relates to the isolation and use of new surface active materials which are present in the oxidation products of petroleum waxes present in the heavy distillates and the residue from the vacuum distillation of crude petroleum. These waxes are largely microcrystalline in structure and are often called microcrystalline waxes or microwaxes. They are to be distinguished from the paraffin wax obtained from petroleum distillates which is largely macrocrystalline in structure.

Microwax oxidates are well-known materials which may be used for various purposes e.g. the preparation of polishes. The oxidates may be prepared by blowing finely dispersed air through microwaxes in the presence of a catalyst, e.g. manganese stearate or lithium stearate.

The new surface active materials according to the invention are obtained by contacting a microwax oxidate with an adsorbent for surface active materials of the wax oxidate whereby the surface active materials are extracted from the wax oxidate by the adsorbent, separating the unextracted wax oxidate from the adsorbent, liberating the surface active materials from the adsorbent by dissolving the latter in an acid, and recovering the liberated surface active materials from the solution of acid and adsorbent.

The adsorbent may be washed with an organic solvent for the oxidised wax after the adsorbent has been separated from the unextracted wax oxidate. Examples of solvents which may be used for this purpose are n-heptane, petroleum ether, benzene, acetone, chloroform and isopropyl alcohol.

The oxidised microwax which is to be contacted with the adsorbent may be dissolved prior to the contacting step, in an organic solvent for the oxidized microwax e.g. n-heptane or petroleum ether.

The adsorbent is preferably a basic metal oxide or hydroxide. Particularly suitable adsorbents are magnesium oxide and calcium hydroxide. Other suitable adsorbents are calcium oxide, barium oxide and barium hydroxide.

Particularly suitable acids for dissolving the adsorbent and liberating the surface active materials include hydrochloric acid and acetic acid.

According to one embodiment of the invention, the extraction of the surface active materials is carried out in a chromatographic column containing the adsorbent, a solution of the oxidised wax feedstock in an organic solvent for the wax oxidate being fed to the column and allowed to percolate through the adsorbent so that these materials are adsorbed by the adsorbent, and additional wax oxidate solvent being subsequently passed through the column to elute material which is not strongly adsorbed by the adsorbent.

According to another embodiment, a solution of the microwax oxidate in an organic solvent is intimately mixed with the adsorbent which is subsequently removed from the mixture by filtration, sedimentation and decanting, or centrifuging and is washed with additional wax oxidate solvent.

According to a further embodiment, the oxidised microwax is mixed intimately in the molten state with the adsorbent, which is then separated as in the previous embodiment and washed with a solvent for the wax oxidate.

Only a small proportion of the strongly adsorbed material can be removed by solvents for the microwax oxidate, e.g. benzene, acetone, isopropyl alcohol, chloroform and pyridine, and it is the unremoved portion of the strongly adsorbed material which has strong surface active properties.

The relative merits of using molten wax oxidate or a solution are that in the former case relatively little wash liquid is required while in the latter case high temperatures are unnecessary.

In all three embodiments described, recovery of the surface active materials is achieved by dissolving the adsorbent containing them in an acid. The surface active materials are left floating on the surface of the solution of acid and adsorbent and they may be recovered by adding an organic solvent which is immiscible with the acid and dissolves them, e.g. n-heptane, petroleum ether or benzene, separating the two layers and recovering the surface active materails from the organic solvent by distilling off the latter. The acid and organic solvent should, of course, be chosen so that two immiscible phases are formed.

The surface active materials produced according to the invention are resinous substances, which may harden and become brittle in time, and are dark in colour, usually reddish brown. They are soluble in many organic liquids including petroleum fractions. They consist mainly of long chain oxygenated material containing carboxyl and hydroxyl groups, some of which may be esterified, also metal salts of organic acids. The yield of active material will depend on the oxidate itself and on the manner in which the separation is carried out and is often in the range of 10 to 25% by weight.

By way of example, a surface active material was prepared as follows:

The wax oxidate feedstock was prepared from a microwax having a melting point of 176° F. and a penetration at 25° C. (ASTM D1321) of 25 mm./10. (The microwax was prepared by recrystallising from methylethyl ketone/toluene at 0° C. a slack wax obtained in the production from a Middle Eastern vacuum residue of a 620/95 grade bright stock lubricating oil.) The oxidate was prepared by bubbling finely dispersed air, at a rate of 20 litres/hour/100 g. wax, through the residual wax at a temperature of 150° C., using 10%, by weight of the wax, of lithium stearate as oxidation catalyst. The oxidate had a saponification number of 16 mg. KOH/g. after 24 hours.

The extraction was carried out in a chromatographic column packed with 750 g. of magnesium oxide and maintained at a temperature of 120° F. 50 g. of the wax oxidate feedstock were dissolved in 100 cc. of n-heptane and allowed to percolate down the column. A further 4000 cc. of n-heptane were subsequently allowed to percolate down the column to remove all but the most strongly adsorbed material.

The adsorbent was then removed from the column and dissolved in an excess of 50% acetic acid which caused the surface active material to be released. They were recovered by agitating the acetic acid solution with 250 cc. n-heptane, separating the two liquid phases which formed on settling and distilling off the n-heptane from the surface active material.

The surface active material recovered in this way had the following properties:

| | |
|---|---|
| Molecular weight | $2200 \pm 100$. |
| Carbon content | 74% wt. |
| Hydrogen content | 11.5% wt. |
| Sulphur content | 0.29% wt. |
| Hydroxyl groups | 3.5% wt. |
| Acid value | 79 mg. KOH/g. |

The ultra-violet spectrum gave no indication of the presence of any aromatic material.

An indication of the surface activity of this material is provided by the surface pressure or force exerted by a solution of the material in n-heptane, as a thin film under compression. The following table of results refers to 0.1 mg. of the material.

| Area, sq. cm.: | Pressure, dyne/cm. |
|---|---|
| 1400 | 0.5 |
| 1000 | 0.6 |
| 750 | 0.9 |
| 500 | 4.0 |
| 400 | 7.0 |
| 300 | 10.5 |
| 200 | 14.0 |
| 100 | 19.5 |
| 30 | 23.0 |

An example of the activity of this surface active material is afforded by its ability to maintain carbon black in suspension in liquids. This was tested by suspending 0.3 g. of carbon black, 8.8 microns, in 200 cc. of light petroleum, and weighing the amount of carbon retained in suspension at four levels in 50 cc. aliquots after 1 hour at 70° F. A commercial additive A was also tested, for comparison. The results are tabulated below.

| Additive | None | Commercial Additive A | Material from oxidised microwax |
|---|---|---|---|
| Concentration, percent wt. | Nil | 0.03 | 0.03 |
| Carbon black retained in suspension, percent wt.: | | | |
| At level 1, top | 8.2 | 12.7 | 15.0 |
| At level 2 | 10.6 | 16.5 | 22.4 |
| At level 3 | 10.2 | 15.8 | 23.8 |
| At level 4, bottom | 71 | 55 | 38.8 |
| Total | 100 | 100 | 100 |

In another similar test 0.1 g. of the carbon black was suspended in 10 cc. of n-heptane, and the visible settling of the carbon black was timed. A comparison of the material according to the invention with a commercial additive B is shown in the following table.

| Time, mins. | Height of settled carbon black, mm. | | |
|---|---|---|---|
| | No additive | Commercial Additive B, 1.0% wt. | Material from oxidised microwax, 1.0% wt. |
| 0 | 85 | 85 | 85 |
| 3 | 22 | | |
| 15 | 13 | 70 | |
| 18 | | 60 | |
| 25 | | 40 | |
| 30 | | | 80 |
| 60 | 10 | | 78 |
| 120 | 10 | | 72 |
| 210 | | | 60 |

The surface active materials according to the invention are strong emulsifying and dispersing agents and an important use of them is in the emulsification of aqueous solutions of inorganic salts in oleaginous liquids as an intermediate step in the dispersion of water soluble materials in oils. An example of this is as follows:

2 g. of the surface active material described above were dissolved in 100 g. of a 150/75 grade mineral lubricating oil. To this solution was added slowly and with gentle stirring a solution of 15 g. of sodium nitrite in 30 g. of water. The resultant mixture was stirred rapidly using a laboratory mixer operating at 3000 revolutions per minute. A stable water-in-oil emulsion was formed.

This emulsion was heated to 140° C. to drive off the water while high speed stirring was continued. The mix was then allowed to cool to atmospheric temperature with gentle stirring.

On examining the anhydrous dispersion of sodium nitrite crystals so formed, under the microscope using polarised light, it was found that a fine even dispersion of sodium nitrite crystals had been obtained, no individual crystal size being greater than 5 microns.

Where it is desired to form a dispersion of water-soluble solids in a grease, a dispersion of the solid in a lubricating oil, prepared as described above, may be mixed with a grease.

The addition of sodium nitrite to lubricants as a corrosion inhibitor using this emulsification technique is known but when using the emulsifying and dispersing agents hitherto suggested for this technique, e.g. sodium stearate, sodium hydroxy stearate, basic calcium alkyl sulphonates and sodium alkyl sulphonate, poor dispersions with large individual crystal sizes were obtained.

We claim:

1. A process for isolating surface active materials from a microwax oxidate, comprising, contacting a liquid feedstock containing a microwax oxidate with a basic acid-soluble adsorbent for the surface active materials contained in said oxidate whereby the surface active materials are extracted from the said oxidate, said adsorbent being selected from the group consisting of magnesium oxide, calcium oxide, barium oxide, calcium hydroxide and barium hydroxide; contacting the unextracted wax oxidate with an organic solvent selected from the group consisting of n-heptane, petroleum ether, benzene, acetone, chloroform and isopropyl alcohol to separate said unextracted wax oxidate from the adsorbent with its contents of adsorbed surface active materials, dissolving said adsorbent in an acid selected from the group consisting of hydrochloric and acetic acids to liberate the surface active materials from said adsorbent; recovering the surface active materials from the solution of acid and adsorbent by dissolving said liberated surface active materials in an organic solvent selected from the group consisting of n-heptane, petroleum ether and benzene.

2. The process as claimed in claim 1 wherein said feedstock comprises said microwax oxidate in a molten state and is intimately mixed with said adsorbent, and said adsorbent thereafter is separated from the resulting mixture.

3. The process as claimed in claim 1 wherein said adsorbent is magnesium oxide.

4. The process as claimed in claim 1 wherein said adsorbent is calcium hydroxide.

5. The process as claimed in claim 1 wherein said acid is hydrochloric acid.

6. The process as claimed in claim 1 wherein said acid is acetic acid.

7. The surface active material obtained by the process set forth in claim 1.

References Cited in the file of this patent

UNITED STATES PATENTS 2,470,339 Claussen et al. _____ May 17, 1949
2,905,704 Hirschler _____ Sept. 22, 1959

OTHER REFERENCES

Schwartz et al.: "Surface Active Agents," Interscience Publishers, Inc. (1949), pages 6, 17 and 19.